W. J. McSORLEY.
MOLDING AND GROOVING HEAD.
APPLICATION FILED AUG. 11, 1911.

1,034,272.

Patented July 30, 1912.

Witnesses
Cora N. Handy.
Juana M. Fallin.

Inventor
W. J. McSorley.

By
Attorneys.

UNITED STATES PATENT OFFICE.

WILLIAM J. McSORLEY, OF EAU CLAIRE, WISCONSIN, ASSIGNOR OF ONE-HALF TO JOHN W. SCOTT, OF EAU CLAIRE, WISCONSIN.

MOLDING AND GROOVING HEAD.

1,034,272.  Specification of Letters Patent.  Patented July 30, 1912.

Application filed August 11, 1911. Serial No. 643,595.

*To all whom it may concern:*

Be it known that I, WILLIAM J. McSORLEY, citizen of the United States, residing at Eau Claire, in the county of Eau Claire and State of Wisconsin, have invented certain new and useful Improvements in Molding and Grooving Heads, of which the following is a specification.

This invention has relation to heads for matching, molding and grooving machines, and has for its object to provide a head of simple structure upon which may be located cutting blades of any desired configuration and which may be adjusted to any desired position. The head is also provided at its opposite sides with concaved channels with bolts traversing the lengths thereof. Grooving saws of peculiar configuration are pivotally mounted upon the said bolts and bear at their edges against the bottoms of the said channels, whereby they are braced in positions against their work.

Figure 1:
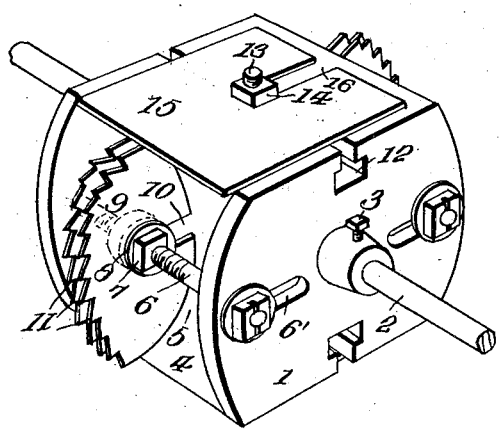
Figure 2:
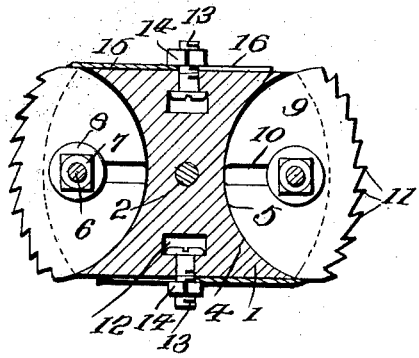
Figure 3:
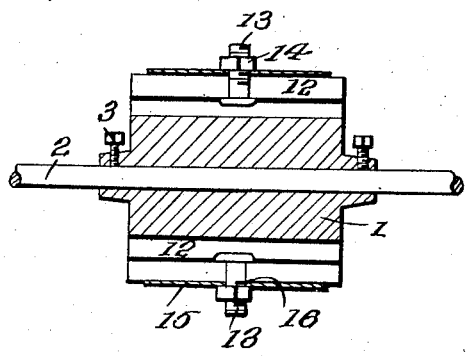

In the accompanying drawing: Figure 1 is a perspective view of the head; Fig. 2 is a sectional view thereof cut transversely across its axis; and Fig. 3 is a sectional view thereof cut longitudinally of its axis.

Corresponding and like parts are referred to in the following description and indicated in all the views of the accompanying drawing by the same reference characters.

The head 1 is provided with a central opening in which is located a shaft 2. Any suitable means may be provided, as for instance a set screw 3, for securing the head 1 to the shaft 2. The head 1 is provided at its opposite sides with channels 4 which terminate short of the ends of the head. These channels are provided with concaved bottoms 5. Bolts 6 are secured at their ends in slots 6' provided in the end portions of the head 1 and traverse the lengths of the channels 4. The said bolts are spaced from the concaved bottoms 5 and are approximately in concentric position with relation thereto. Nuts 7 are screw threaded upon the bolts 6 and lie between the ends of the channels 4. Washers 8 are located one upon each of the bolts 6 and between the nuts located upon the respective bolts. These washers may be of any desired thickness.

Saw blades 9 are provided at their inner edge portions with slots 10 which receive the bolts 6 and the said slots are of sufficient length so that the inner edge portions of the blades 9 may bear in close contact against the concaved bottoms 5 of the channels 4. The blades 9 are provided at their outer edges with teeth 11 which are arranged concentric with relation to the axis of the shaft 2.

The head 1 is provided at its opposite sides and at points approximately midway between the channels 4 with grooves 12 which extend from end to end of the said head. Bolts 13 are adjustably secured in the said grooves and nuts 14 are screw threaded upon the outer ends of the said bolts 13. Blades 15 are adapted to lie flat against the opposite sides of the head 1 and are provided with elongated slots 16 which receive the bolts 13, and the nuts 14 are adapted to be screwed down against the outer faces of the last mentioned blades and clamp the same in adjusted positions against the opposite sides of the head 1. The cutting edges of the blades 15 lie immediately behind the sets of teeth 11 carried by the saw blades 9 and the cutting edges of the blades 15 may be of any desired configuration.

In operation the blades 15 are designed to form surfaces upon the edges of a strip of wood, while the said blades 9 are designed to groove or tongue the same. These blades may be adjusted to cut deep or shallow as desired.

Having thus described the invention, what is claimed as new is:

A head having at its side a channel which is bounded at its ends by the end portions of the head, a bolt traversing the length of the channel, the ends of the head having elongated slots which receive the ends of the bolt, means for securing the bolt in an adjusted position in the slot, clamping nuts located within the channel upon the intermediate portion of the bolt, and blades having at their inner portions slots which open at their ends at the edges of the blades, said slots in the blades receiving the intermediate portion of the bolt and the nuts clamping said blades in position upon the bolt.

In testimony whereof I affix my signature in presence of two witnesses.

WILLIAM J. McSORLEY. [L. S.]

Witnesses:
J. W. SCOTT,
B. F. HEADLEY.

Copies of this patent may be obtained for five cents each, by addressing the "Commissioner of Patents, Washington, D. C."